Figure 5:
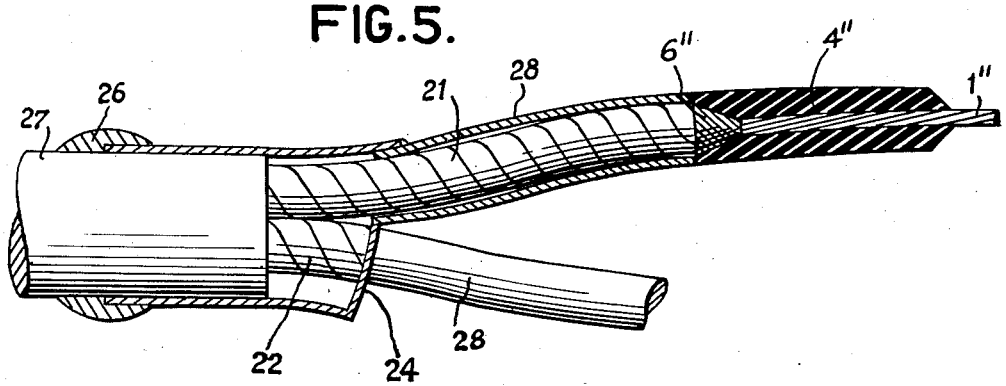

Feb. 10, 1942.    T. R. SCOTT ET AL    2,272,615
ELECTRIC CABLE
Filed Oct. 15, 1938    2 Sheets-Sheet 1
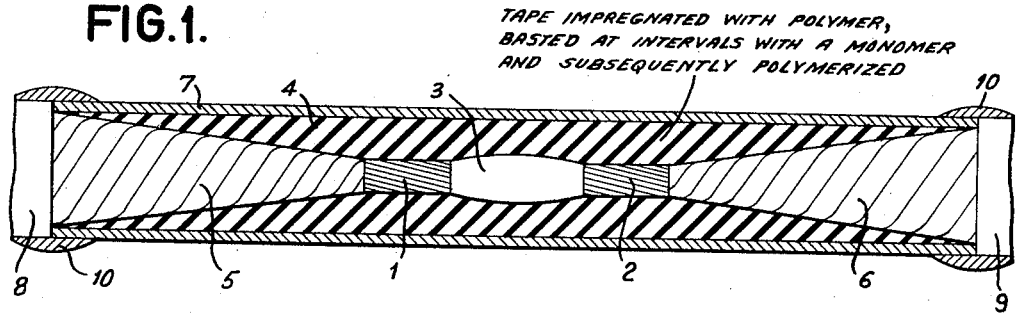
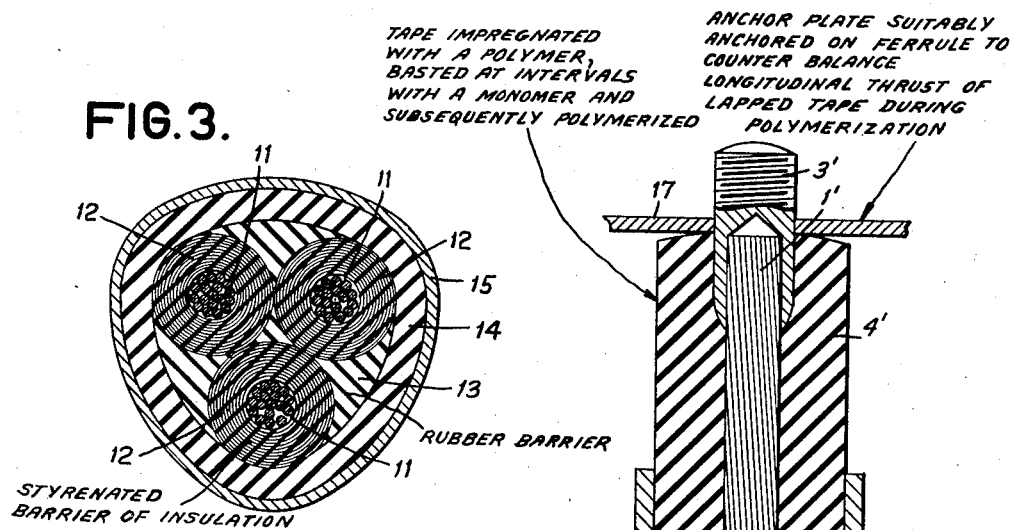
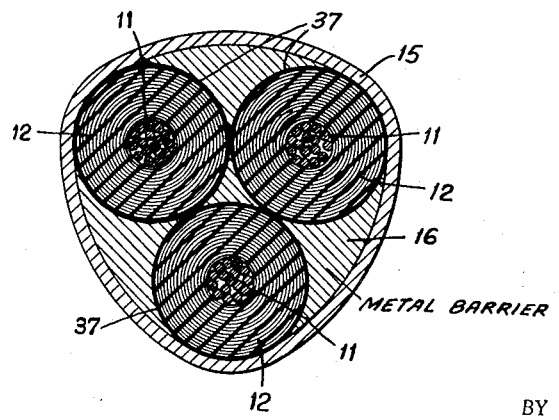
INVENTOR.
THOMAS R. SCOTT
JAMES K. WEBB
BY
ATTORNEY.

INVENTORS:—
Thomas R. Scott,
James K. Webb.
By
R P Morris
ATTORNEY.

Patented Feb. 10, 1942

2,272,615

UNITED STATES PATENT OFFICE 2,272,615

ELECTRIC CABLE

Thomas Robertson Scott and John Krauss Webb, London, England, assignors to International Standard Electric Corporation, New York, N. Y.

Application October 15, 1938, Serial No. 235,182
In Great Britain October 26, 1937

10 Claims. (Cl. 174—22)

This invention relates to electric cables and more particularly to a method of preparing barrier joints and terminations in impregnated power cables.

In Webb's United States Patent No. 2,105,567 a method was described whereby a joint could be built up by lapping or taping the joint with papers or the like impregnated with a monomeric liquid in place of hydrocarbon oil or compound. The joint so built up was enclosed in a metal sleeve which was evacuated and filled up with monomeric liquid. Heat was then applied for a sufficiently long period of time, almost always over two days, to convert the monomeric liquid within the cable into a solid polymer whereby a barrier or stop-joint of high efficiency and electrical quality was obtained.

We have found it disadvantageous to have to apply heat for a period of time necessary to convert considerable quantities of monomer into polymer within the cable, the more so since the normal period of time for the polymerisation, at temperatures which may safely be applied to cables whose insulation consists of impregnated fibrous material, is usually in excess of that found by experiment as characteristic for the pure monomer. This may be due to the admixture of the monomer with oil plasticisers, oil solvents and so on, during the taping and filling operations. A prolonged heat treatment such as is necessary to effect polymerisation may also introduce the possibility of voids forming which may arise from the cooling and contraction of the solid polymer from the temperature of polymerisation.

We have therefore carried out experiments with a view to cutting down the period of heating required and the chief object of the present invention is to provide a method of preparing a barrier joint or termination of polymerised material without the necessity of taking special steps to effect the polymerisation of considerable quantities of free monomer within the cable after building up of the joint or termination.

In accordance with the present invention there is provided a method of preparing a barrier, such as used at joint or termination, in an impregnated power cable comprising building up the insulation around the conductor core or cores with tapes of fibrous insulating material impregnated with polymerised material, basting the impregnated tapes with polymerisable material at intervals during the building up operation in order to cause them to adhere to one another to form a solid barrier in the cable, disposing a protective sleeve around the built up insulation and maintaining the barrier at polymerising temperature until polymersation of the polymerisable material occurs.

Figure 6:
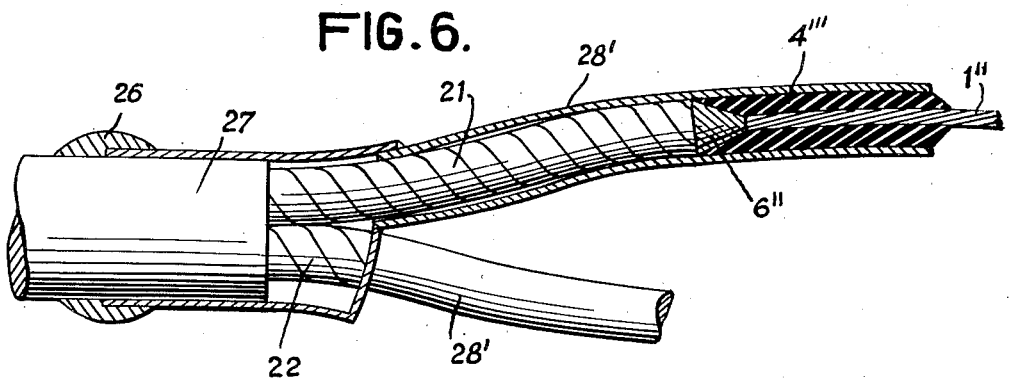

The principles of our invention may be more fully understood by the description made with reference to the accompanying drawings illustrating a few structural embodiments of cable terminations or joints made in accordance with our invention, in which Fig. 1 is a side elevation partly in section of a cable joint constructed in accordance with our invention, Fig. 2 is a side elevation partly in section of a cable termination in accordance with our invention, Figs. 3 and 4 are sectional views through multi-core cables constructed in accordance with our invention, and Figs. 5 and 6 illustrate modified forms of cable terminations embodying our invention.

In more detail, in the preparation of a barrier joint it is proposed to substantially cut down the heat treatment required after building up of the insulation, by carrying out the major portion of the polymerisation prior to the lapping or taping of the joint. In order to effect this, paper or fabric tapes after impregnation with polymerisable material are heated in order to effect the polymerisation providing a styrenated barrier as indicated in the figures of the drawings. Technique for preparing fibrous insulating tapes impregnated with polymerised material is set forth in Webb's United States Patents 2,147,824 and 2,232,041, and such tapes are very suitable for use in the method according to this invention. During lapping or taping of the tapes a film of polymerisable material is painted or basted over each tape or at frequent intervals so that the polymerised material in the tapes is thereby rendered sticky or tacky and adjacent tapes adhere together.

It may be explained that the process of polymerisation is generally considered to consist of building up the concentration of polymer dissolved or suspended in the monomer until substantially 100% of polymer is obtained. The film of monomer painted or basted on the tapes may therefore be looked upon as dissolving or possibly chemically swelling polymer contained in the adjacent tapes so that the whole structure of the joint comprises fibrous material and polymeric material slightly diluted with monomer, i. e. almost completely polymerised. In this way the necessity for a prolonged period of heating (i. e. two days or more) is avoided, but it will be appreciated that a certain amount of heating may be applied (e. g. up to 10 hours) in order to improve the general uniformity and to assist the diffusion of the sticky film of monomer admixed with polymer into any small voids that may be present.

In other respects the construction of the joint may be the same as that described in United States Patent No. 2,105,567. Evacuation and filling may be carried out as the final operation to ensure the elimination of voids which might otherwise be included due to faulty work in construction of the taped structure but the presence of large spaces which might be filled with monomer which would require a long period of time to polymerise at ambient temperature should obviously be avoided.

Considering the preparation of a joint in rather more detail referring to Fig. 1 by way of example, the conductors 1, 2 of the adjacent cable lengths are first jointed together by a ferrule 3 and the cable insulation 5, 6 is tapered back in the usual manner. The taper is then basted with cable oil heated to 120° C. for about ten minutes, after which it is wiped clean of loose oil with a dry cloth and then basted with monomer which may if desired be heated to about 70° C. This results in good penetration of the tapered cable insulation by the monomer. The tapes impregnated with polymer, e. g. the pre-polymerized tapes, are then applied in the usual manner to form styrenated barrier 4, but after the application of each layer it is painted with a thin layer or film of monomer to fill the interstices between the tapes. The monomer used should preferably be thin having a viscosity of less than 100 centistokes (previously centipoises), and just sufficient to ensure complete filling. In this way, when freshly applied, it acts as a lubricant enabling each tape to be readily tightened and may as explained above be looked upon as dissolving the polymer to form a tacky mass rapidly turning solid enabling each tape to be readily tightened. This is important as it has in general been found that the electrical strength increases with the tightness with which the tapes can be applied. A certain proportion of the accelerator may with advantage be admixed with the monomer as it is desirable that the joint should become as solid as possible after the application of the tapes to minimise oil penetration. In the case of monomeric styrene concentrations up to about 1% of benzoyl peroxide are satisfactory.

The technique according to the invention may also be applied to the construction of terminations for example as shown in Fig. 2. In the case of a termination in a single core 1' cable, the cable end may be tapered or stepped and the tapes impregnated with polymer then applied and basted as described above to provide barrier 4'. The stranded conductor may have a solid ferrule 3' attached thereto with the applied tapes taken over the solid ferrule so that the connection between the ferrule and the conductor may be made within the applied insulation. Since a termination of this type is in effect half a joint and since the thrust due to mechanical effects induced by the tightness of lapping and the swelling of the polymer by the monomer may be somewhat severe, it may be necessary to build up a temporary anchoring plate 17 on the ferrule 3' so that the longitudinal thrust of the lapping is counterbalanced until the termination had "set" as a solid.

It is preferable to fill any such spaces, e. g. the space between the enclosing metal sleeve 7 and the built-up insulation 4, Fig. 1, with materials which are swollen by the monomer, e. g. rubber or synthetic rubber as shown in Patent No. 2,105,567. The swollen mass at once produces a barrier action which increases in efficiency as polymerisation proceeds at ambient temperature.

Another method is to lap on layers of tinned copper tape tightly over the joint insulation and then to solder the layers together and to the lead sheath as also shown in the above patent. A suitable sleeve may be applied overall. Alternatively, the sleeve 7 (shown in Fig. 1) may be applied directly without recourse to the copper tape, e. g. a lead sleeve may be wiped on and the space between the sleeve and the insulation filled directly with melted material, e. g. lead tin alloy. The inner surface of the lead sheath should first be tinned so that the alloy will bond thereto. The sheath 7 is sealed to the cable sheaths 8 and 9 by the sealing material 10. Similar treatment is particularly advantageous in the treatment of multi-core cables, such as are illustrated in Figs. 3 and 4. For example, referring to Fig. 3 the invention includes a method of preparing a barrier joint in an impregnated multi-core belted type cable comprising building-up the insulation 12 directly around the cores 11 with tapes of fibrous insulating material impregnated with polymerised material and basting the impregnated tapes at intervals with polymerisable material during the building-up operation, thereafter rebuilding the belt insulation 14, disposing a protecting sleeve 15 around the joint or termination, forming a barrier 13 in the worming spaces between the insulated cores by feeding in insulating material in liquid or plastic form adapted to solidify in the said spaces and completing the joint or termination by forming a barrier of polymerised material in the belt insulation 14. The barrier in the belt insulation may be formed by building up the said belt from tapes of fibrous material impregnated with polymerised material and basting at intervals as described above. As shown in Fig. 4 similar treatment may be applied in connection with impregnated screened type multi-core cables wherein each core is screened by a layer of conductive material 37 applied thereon. In this case the barrier 16 in the worming spaces may be of metal due to the fact that such spaces are outside the electric field. Numeral 12 refers to the insulation built-up around cores 11, and numeral 15 refers to a protecting sleeve. In this case provision should be made for filling any voids which may form in the insulation around the cores during the metal filling. A suitable method for effecting this is described in Webb's United States Patent 2,213,875.

The fibrous tapes may be impregnated with any suitable polymerised material and it may be mentioned that the fibrous tapes may be totally impregnated or may only be lacquered or surface impregnated to a sufficient extent for the polymer to bind into the surface of the fibrous material in which case an equally satisfactory layer of polymer is provided on the surface of the tape. If the tapes are merely lacquered or surface impregnated with polymer, it may be desirable for the tapes to be pre-impregnated with a hydrocarbon or similar compound (e. g.

resin/resin oil) prior to lacquering in order to reduce the risk of ionisation at high voltages in the interior of the tapes. The basting may be effected also by any suitable polymerisable material which may be the same as the polymer impregnating the tapes or different therefrom.

At this point it may be mentioned that the monomers and polymers employed in accordance with this invention should be suitable for forming liquid-resisting barriers in cables. Such materials should in monomeric form be liquid at normal atmospheric conditions and should be capable of being polymerised to form a solid polymer having sufficiently low dielectric loss properties. The dielectric loss that can be tolerated will obviously depend upon the cable in question, but the electrical properties of the polymer should be such that the barrier insulation does not form a source of electrical weakness in the cable. In addition the polymerisable material employed for basting should obviously be capable of rendering tacky the surface layer of the polymer forming the impregnant of the fibrous tapes.

The monomer used for basting may be semi-polymerised before application to the insulation, but since the viscosity may be raised very considerably by a small degree of polymerisation, it is not desirable to carry this process too far. If, however, the monomer has been stabilised by the addition of an inhibitor, e. g., styrene stabilised by the addition of quinone or other stabilising agent, in accordance with Foord's United States Patent 2,225,471, heat treatment should be applied before use so that the induction period is over before application to the joint. Accelerators may also be added to speed up completion of the polymerisation. Among the monomers that may be employed for impregnating the tapes (thereafter polymerised for application to the cable) and for basting, styrene may be mentioned as the most satisfactory. It may also be mentioned that lacquered tapes may be produced by applying polymer e. g. polystyrene in a suitable solvent, e. g. benzene. Suitable plasticisers or fillers may be admixed with the monomer for impregnating the tapes and with the monomer for basting. For example, up to 15% (preferably about 10%) of a suitable plasticiser, such as abalyn or an aromatic such as one or more of the naphthalenes (e. g. methyl, ethyl, or propyl naphthalene), phenanthrene, fluorene or diphenyl, may be blended with styrene. Styrene blended with other monomers for example, para-divinyl-benzene with or without plasticisers may also be employed for impregnating and/or basting.

It will be understood from the above description that the invention may readily be applied in connection with the preparation of terminations in single core cables, i. e. cables having only one core or cable having several cores each individually protected by a lead sheath and laid up in a common armouring as shown in Fig. 5. When dealing with terminations in multi-core cables however special difficulties arise due to the necessity for terminating the worming spaces. It is proposed therefore according to the invention to avoid the necessity for forming a barrier in the worming spaces at a termination by threading the insulated cores 21, 22 into an end cap 24 fitted with exit pipes 28, one for each core in the cable and building up the insulation around the protruding cores 1" and tapered insulation 6" by lapping on fibrous insulation 4" impregnated with polymer and basting with monomer as described above. Alternatively as shown in Fig. 6 each core 21 may have its insulation 4'" built up over the tapered insulation 6" and the conductor 1" and may thereafter be threaded into a suitable end cap 24 so that the insulation inside the exit pipes is built up. The end cap 24 with its exit pipes 28' may be made of metal preferably lead, when the multi-core cable comprises screened cores but in the other cases it should be made of suitable insulating material and the end cap is sealed to the lead sheath 27 of the cable by the seal 26. By this method it is not necessary to form a barrier in the worming spaces and the end of each insulated core is heated, in practice, as a single core cable for the purposes of the termination.

What is claimed is:

1. A method of preparing a barrier in an impregnated power cable comprising building up the insulation around the core conductor with tapes of fibrous insulating material impregnated with polymerized material, basting the impregnated tapes with polymerisable material at intervals during the building-up operation in order to cause them to adhere to one another to form a solid barrier in the cable, disposing a protective sleeve around the built up insulation, and maintaining said barrier at polymerizing temperature until polymerization of the polymerizable material occurs.

2. A method of preparing a barrier in an impregnated power cable comprising building up the insulation around the core conductor with tapes of fibrous insulating material impregnated with polystyrene, basting the impregnated tapes with monomeric styrene at intervals during the building up of the insulation in order to cause them to adhere to one another to form a solid barrier in the cable, disposing a protective sleeve around the built up insulation, and maintaining said monomeric styrene at polymerizing temperature until the polymer is formed.

3. A method according to claim 1 characterized in this that a partially polymerized material is employed for the basting of the tapes.

4. A method of preparing a cable barrier in an impregnated multi-core belted type cable comprising building up the insulation directly around the conductor cores with tapes of fibrous insulating material impregnated with polymerized material and basting the impregnated tape with polymerizable material at intervals during the building up operation, thereafter rebuilding the belt insulation, disposing a protecting sleeve around the rebuilt belt insulation, forming a barrier in the worming spaces between the insulated cores by feeding-in insulating material in liquid or plastic form adapted to solidify in the said spaces and completing the cable barrier by forming a barrier of polymerized material in the belt insulation, and by maintaining said polymerizable material at polymerizing temperature until polymerization occurs.

5. A method according to claim 4, characterized in this that the barrier is formed in the belt insulation by building up the said belt of fibrous tapes impregnated with polymerized material and basting at intervals with polymerizable material.

6. A method of preparing a barrier in an impregnated type multi-core cable comprising building up the insulation directly around the conductor cores with tapes of fibrous insulating material impregnated with polymerized material and basting the impregnated tapes with polymerizable material at intervals during the building-up operation thereafter disposing a protecting sleeve around the built up insulation, forming a barrier in the worming spaces between the cores by feeding-in liquid or plastic material adapted to solidify in the said spaces, and subjecting said polymerizable material to polymerizing temperature until a polymer is formed.

7. A method according to claim 6 characterized in this that the liquid or plastic material is molten metal.

8. A method of forming a barrier termination in a multi-core cable comprising threading the insulated conductor cores into an end cap provided with a separate exit pipe for each core in such a manner that the cores project from the exit pipes, building up the insulation around the protruding cores with tapes of fibrous material impregnated with polymerized material and basting the impregnated tapes with polymerizable material at intervals during the building up operation so that each insulated core may be treated as a separate cable during completion of the termination, sealing the end cap to the cable sheath, and maintaining said polymerizable material at a polymerizing temperature until polymerization occurs.

9. A method of forming a barrier termination in a multi-core cable comprising building up the insulation around the conductor cores with tapes of fibrous insulating material impregnated with a polymerized material, basting the impregnated tapes with polymerizable material at intervals during the building up operation, thereafter introducing the insulated cores into an end cap provided with a separate exit pipe for each insulated core so that each core may be treated as a separate cable during the completion of the termination, sealing the end cap to the cable sheath, and maintaining said polymerizable material at a polymerizing temperature until polymerization occurs.

10. A method according to claim 1, characterized in this that styrene blended with at least one other monomer is employed for impregnating and basting.

THOMAS ROBERTSON SCOTT.
JOHN KRAUSS WEBB.